US012752422B2

(12) United States Patent
Hu et al.

(10) Patent No.: US 12,752,422 B2
(45) Date of Patent: Oct. 6, 2026

(54) INDUSTRIAL ROBOT PRODUCTION DATA CLUSTERING FOR ANOMALY PREDICTION

(71) Applicant: FANUC AMERICA CORPORATION, Rochester Hills, MI (US)

(72) Inventors: Xin Hu, Ann Arbor, MI (US); Yi Sun, Bloomfield Hills, MI (US); Claude Dinsmoor, Rochester Hills, MI (US); Rick Wunderlich, Canton, MI (US)

(73) Assignee: FANUC America Corporation, Rochester Hills, MI (US)

( * ) Notice: Subject to any disclaimer, the term of this patent is extended or adjusted under 35 U.S.C. 154(b) by 149 days.

(21) Appl. No.: 18/603,583

(22) Filed: Mar. 13, 2024

(65) Prior Publication Data

US 2025/0289127 A1 Sep. 18, 2025

(51) Int. Cl.
*B25J 13/08* (2006.01)
*B25J 9/16* (2006.01)
*G06F 18/23213* (2023.01)
*G06F 18/2433* (2023.01)

(52) U.S. Cl.
CPC ........... *B25J 9/1653* (2013.01); *B25J 9/1674* (2013.01); *B25J 13/085* (2013.01); *G06F 18/23213* (2023.01)

(58) Field of Classification Search
CPC ...... B25J 9/1653; B25J 9/1674; B25J 13/085; G06F 18/23213
See application file for complete search history.

(56) References Cited

U.S. PATENT DOCUMENTS

2023/0078625 A1* 3/2023 Kaehler ................. B25J 9/1682 700/245
2024/0351209 A1* 10/2024 Graabæk ................ G06N 20/00

OTHER PUBLICATIONS

Shutaywi M, Kachouie NN. Silhouette Analysis for Performance Evaluation in Machine Learning with Applications to Clustering. Entropy (Basel). Jun. 16, 2021;23(6):759. doi: 10.3390/e23060759. PMID: 34208552; PMCID: PMC8234541. (Year: 2021).*
Schmidt et al., DE 102023209756 A1, Schmidt, Oct. 5, 2023 (Year: 2023).*

* cited by examiner

*Primary Examiner* — Adam R Mott
*Assistant Examiner* — Heather J Keniry
(74) *Attorney, Agent, or Firm* — John A. Miller; Shumaker, Loop & Kendrick, LLP

(57) ABSTRACT

A method and system for analyzing robot data to identify anomalies. Data from robot production operations are provided to a processor running a K-means clustering algorithm which separates the data into a number (K) of clusters. The K-means clustering algorithm is executed two or more times on the data, each time using a different value of K within a predefined range. A scoring technique is used to determine an optimal value for the number of clusters K, where the score is calculated in a computation which rewards small distances between points within a cluster and large distances between points in different clusters. The K-means clustering results for the optimal value of K are used to separate the data by cluster, whereupon the separated data is analyzed to identify trends in the parameter data. One of the clusters may contain outlier data points, some of which may indicate an anomaly condition.

25 Claims, 9 Drawing Sheets

300

INDUSTRIAL ROBOT PRODUCTION DATA CLUSTERING FOR ANOMALY PREDICTION

BACKGROUND

Field

The present disclosure relates generally to the field of industrial robot operational diagnosis and, more particularly, to a method and system for analyzing data from production operations of a robot to identify anomaly conditions, including applying a K-means clustering algorithm using a scoring technique to determine an optimal value for the number of clusters K, the data points are separated by cluster for further analysis, and one of the clusters may contain data indicating any anomaly condition.

Discussion of the Related Art

The use of industrial robots to perform a wide range of manufacturing, assembly and material movement operations is well known. Many of these operations and tasks are performed by articulated robots, such as five- or six-axis robots with a servo motor at each rotational joint. Control of such robots is provided in real time, where an end tool motion program is divided into small increments of motion, and a robot controller performs the real-time feedback control calculations to compute joint motor input commands which move the robot end tool according to the prescribed motion program.

Like any machine or mechanical device, industrial robots are subject to wear and degradation over time-particularly when the robots are in near-continuous operation, and even more so when the robots experience high velocities, accelerations, forces and/or torques during their motion programs. Because of the potential for degradation over time, it is known to collect data during robot production operations and analyze the data for any early indication of a problem needing attention. For example, certain data trends could indicate that a joint bearing is worn and in need of replacement, or that a servo motor at a joint is not performing within specification. When indicators such as these are detected, the robot may be taken out of production to allow for maintenance to be performed.

Existing robot data analysis techniques typically look for out-of-normal data points (such as a joint torque value which is outside of a normal range of values), and for trends in data values over time. When evaluating data trends, it is common for the analysis software to compute a trend line which characterizes a particular parameter over time. For example, a trend line could be drawn through the maximum values of torque at a particular joint as the robot operates over a period of time (which could be days, weeks, months, etc.). If the trend line has a direction and rate of change greater than a predefined threshold, the software will provide a notification or alert indicating that the joint is deteriorating and that maintenance should be performed.

However, in the example described above, it is possible that the robot is handling mostly lightweight objects for a period of time, and handling mostly heavy objects thereafter. The variation in the work being performed by the robot may be the cause of the data pattern changes, rather than an actual problem or deterioration in the robot. In the same way, an actual developing problem may be masked by changes in the duty cycle of the robot. Unless the data is manually separated into different job types and program branches by the robot operator, existing robot data analysis methods are susceptible to drawing erroneous conclusions and raising many false alarms.

In light of the circumstances described above, there is a need for an improved method of analyzing robot data to better determine actual data patterns and identify any anomalies needing attention.

SUMMARY

The present disclosure describes a method and system for analyzing robot data to identify anomalies. Data from robot production operations are provided to a processor running a K-means clustering algorithm which separates the data into a number (K) of clusters. The K-means clustering algorithm is executed several times on the data, each time using a different value of K within a predefined range. A scoring technique is used to determine an optimal value for the number of clusters K, where the score is calculated in a computation which rewards small distances between points within a cluster and large distances between points in different clusters. The K-means clustering results for the optimal value of K are used to separate the data by cluster, whereupon the separated data is analyzed to identify any noteworthy data patterns in the parameter data. One of the clusters may contain outlier data points, some of which may indicate an anomaly condition. Other types of clustering algorithms besides K-means may also be used.

Additional features of the presently disclosed systems and methods will become apparent from the following description and appended claims, taken in conjunction with the accompanying drawings.

DETAILED DESCRIPTION OF THE EMBODIMENTS

The following discussion of the embodiments of the disclosure directed to robot production data clustering for anomaly prediction is merely exemplary in nature, and is in no way intended to limit the disclosed devices and techniques or their applications or uses.

Industrial robots are used for a variety of manufacturing, assembly and material movement operations. Although robots can be operated in a manual control mode, it is common for robots to be provided with a predefined motion program which controls the robot's movements. For example, a spot welding robot would have a motion program which defines several sequential locations on a workpiece where a spot weld is to be performed. A pick-and-place robot would have a motion program which defines a first location and orientation where a workpiece is to be grasped and a second location and orientation where the workpiece is to be placed. These are very basic examples, and many other types of robotic operations are known in the art.

Like any other machine, industrial robots are subject to wear and tear over the course of their service life. Some types of wear conditions can create inaccuracies in the movement of the robot's tool through the prescribed motion program, or can lead to a breakdown where the robot can no longer operate. For these reasons, it is common to monitor data from production operations of robots and analyze the data to detect early indications of any problems. This analysis is the subject of the present disclosure.

Figure 1:
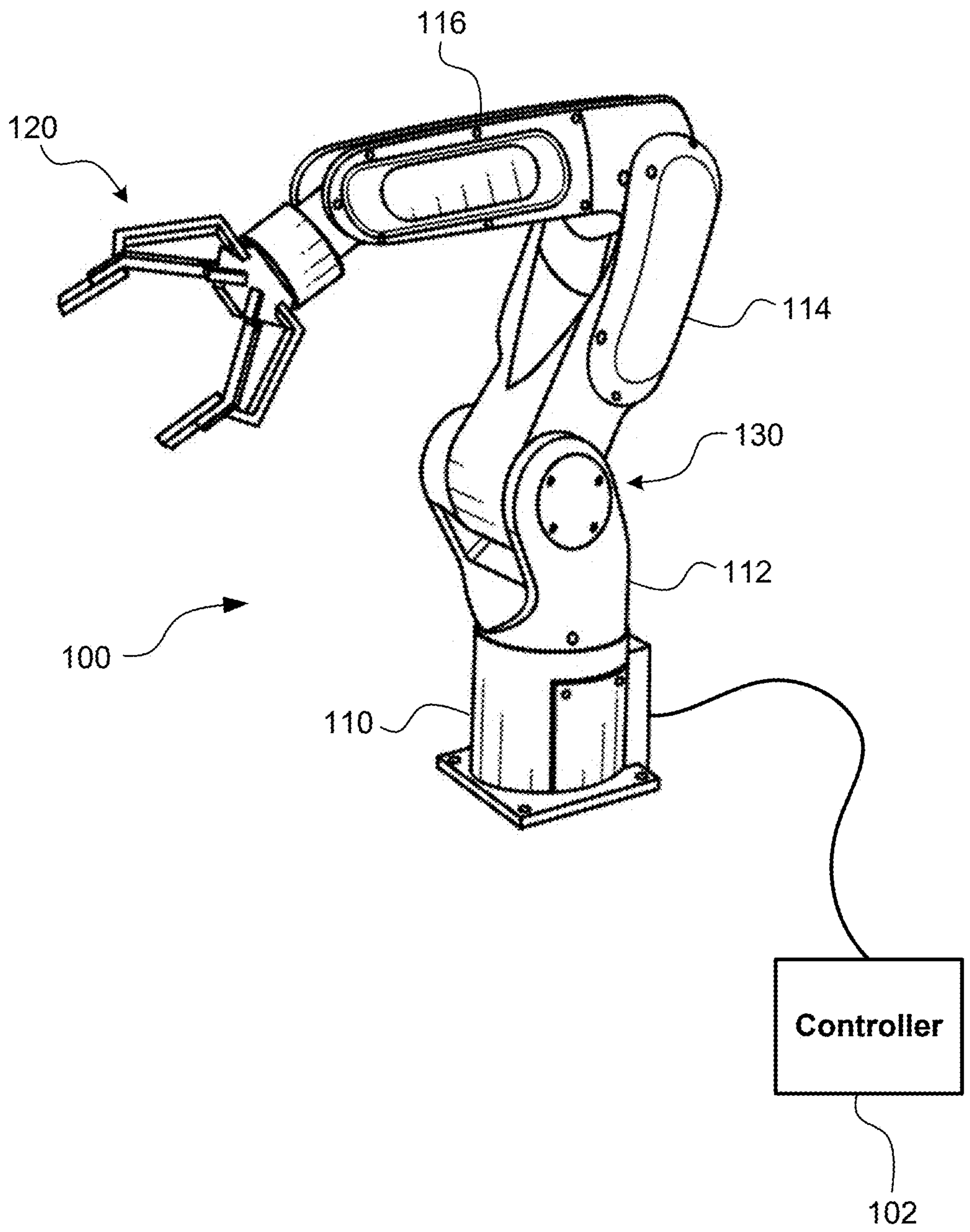
FIG. 1 is an illustration of an industrial robot having an articulated arm including multiple joints, where data from the joints is analyzed using the techniques of the present disclosure.

FIG. 1 is an illustration of an industrial robot 100 having an articulated arm including multiple joints, where data from the joints is analyzed using the techniques of the present disclosure. The robot 100 is controlled by a controller 102 to perform a task described by a motion program, as discussed above and as known in the art. The robot 100 is an articulated robot comprised of a base 110, a link 112, a link 114, a link 116 and a tool 120, among other parts. In the robot 100, each robot arm link is connected to an adjacent link by a rotational joint, where motion in each joint is controlled by a joint motor, and each joint's actual angular position is measured by an encoder which provides a signal back to the controller 102. The controller 102 sends joint motion commands to the joint motors, causing the robot 100 to move the tool 120 through the prescribed motion program.

A joint 130 couples the link 112 to the link 114, and is used as an example for the current discussion. The joint 130 would typically include one or two support bearings in addition to the joint motor and position encoder described above. The bearings and the motor, along with possibly other components of the joint 130, are all susceptible to wear and degradation over time. For this reason, it is common to measure and record joint parameter data during robot operation, and analyze the data to identify any anomalies. A parameter which is commonly measured at robot joints is motor torque. The torque may be measured directly, or may be determined from motor electrical current which is measured. Other parameters may be recorded and analyzed-such as a difference between a theoretically estimated torque and an actual torque (known as disturbance torque), and a difference between a desired position and an actual position of a joint. These are discussed further below.

The robot 100 of FIG. 1 is shown with a mechanical gripper and a particular arm configuration (number of links). It is to be understood that the data clustering techniques of the present disclosure are applicable to industrial robots having different arm configurations from the robot 100, different end-of-arm tools, and/or used for different applications. For example, the presently disclosed techniques may be also used with robots configured for painting, material dispensing welding, machine tending, material movement using a vacuum gripper, and so forth. Furthermore, data from any of the joints of any of these robots may be analyzed in the manner discussed below.

Figure 2:
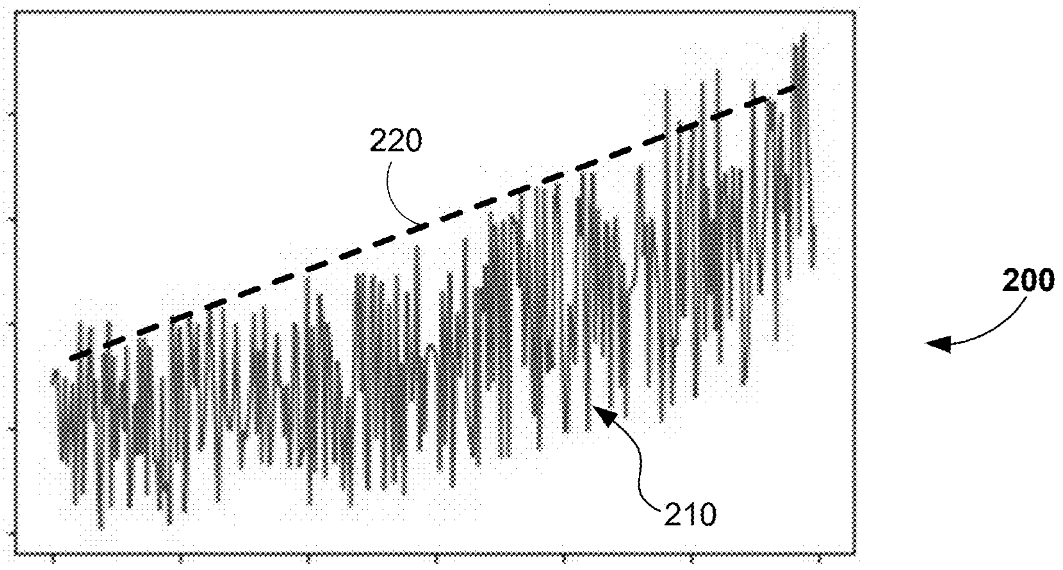
FIGURE 2 (Prior Art)
FIG. 2 includes a graph of robot joint parameter data for an idealized scenario, along with a graph of the robot joint parameter data from a real-world scenario where erroneous conclusions can be drawn using data analysis techniques known in the art.
Figure 2:
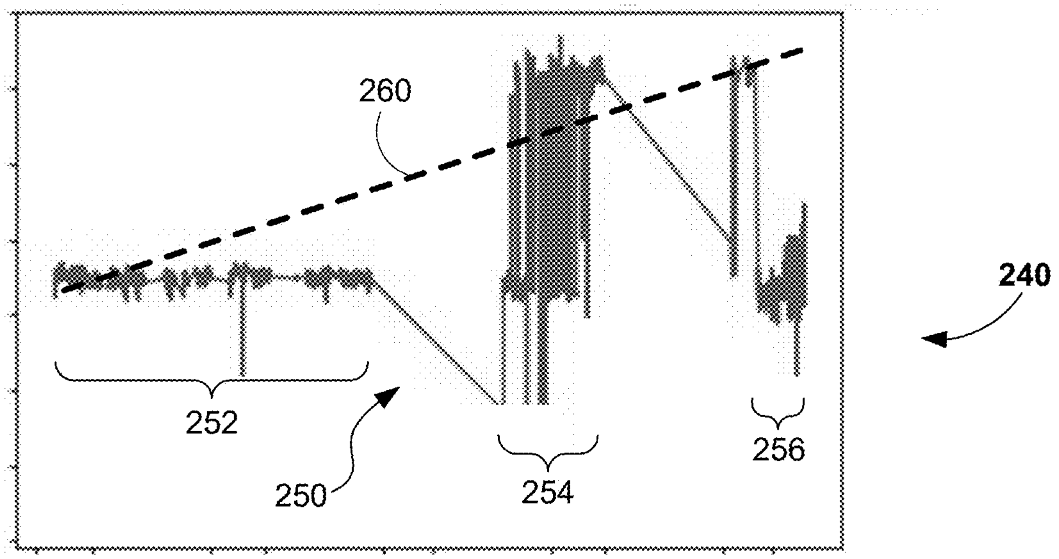
FIGURE 2 (Prior Art)

FIG. 2 includes a graph 200 of robot joint parameter data for an idealized scenario, along with a graph 240 of the robot joint parameter data from a real-world scenario where erroneous conclusions can be drawn using data analysis techniques known in the art. Both the graph 200 and the graph 240 plot the joint parameter data on a vertical axis versus time on a horizontal axis.

Consider robot joint torque as the parameter to be analyzed. Time-series data for torque in a joint will typically be highly cyclical, as the robot repeatedly performs its job task. For example, if the job task is for the robot to grasp an object from a conveyor and place the object on a pallet or in a shipping container, the torque at a joint will increase and decrease as the robot moves to the start location, grasps the object, moves to the destination location, places and ungrasps the object, and returns to the start location. This type of cyclical joint torque (versus time) is illustrated in a trace 210 in the graph 200.

It is apparent that the trace 210 has an upward trend in addition to the rapid cyclical variation. Existing robot data analysis methods are designed to identify trends such as that seen in the graph 200. A trend line 220 may be drawn to characterize the data in the trace 210, where the trend line 220 may be computed using a least-squares calculation applied to the peak torque values from each cycle in the trace 210, for example. The trend line 220 has a significant positive slope, and existing robot data analysis methods would issue an alert based on the slope of the trend line 220, believing this to be an indication of a developing problem in the corresponding robot joint.

The graph 200 and the trend line 220 are illustrative of the type of data that is expected to be encountered in robot joint data analysis tools. However, the data that is actually encountered from real-world robot operations may be much different than that shown in the graph 200.

The graph 240 includes a trace 250 which plots the joint torque (versus time) for an exemplary real-world robot operation. The trace 250 can be observed to include three distinct sections—labeled as sections 252, 254 and 256. The sections 252, 254 and 256 represent three different operating conditions of the robot, each of which has significantly different joint torque characteristics. The section 252 may be data from an operating condition which includes small robot motions with low accelerations, and/or lightweight workpiece movement. Conversely, the section 254 may be data from an operating condition which includes large robot motions with high accelerations, and/or heavy workpiece movement. The section 256 represents yet another operating condition. The data in the trace 250 is typical of real-world robot operations—where an individual robot may perform widely varying job tasks from one day to the next, or within shifts on a single day, or even switch from one job task to another on a job-by-job basis. To summarize—the operating conditions of a robot, including what task is being performed, what branch of a control program has been followed, what type of workpiece is being handled, trajectory characteristics, and more—can greatly influence joint loads. Furthermore, changing operating conditions are frequently experienced by individual robots, and measured robot joint parameter data is therefore likely to contain multiple operating conditions.

When a trend line 260 is drawn to characterize the joint torque data in the graph 240, as would be done by a traditional robot joint data analysis system, the trend line 260 will have a significant positive slope similar to the trend line 220 on the graph 200. The traditional robot joint data analysis system will issue an alert, based on the slope of the trend line 260, indicating a problem at the corresponding robot joint. However, this alert would be based on the erroneous conclusion that the joint torque increase is due to a problem at the robot joint, when in fact the torque increase trend is due to the nature of the operating conditions which are contained in the underlying torque data.

In the discussion of FIG. 2, the slope of a trend line was described as being indicative of a problem or perceived problem with the robot. The slope of a trend line is just a simple example which illustrates how deterioration of a robot joint might be detected. In later discussion of the techniques of the present disclosure, more general analysis techniques are employed to detect characteristics in the data which may be indicative of a problem with the robot.

FIG. 2 illustrates a problem which is commonly experienced with traditional robot joint data analysis systems—that being the inability to distinguish between operating conditions which are represented in measured robot parameter data, and the resulting erroneous conclusions which are reached (i.e., false alarms) regarding robot component degradation and the need for maintenance. In the graph 240 of FIG. 2, the three distinct operating conditions are clearly visible in the data, so it would be possible to separate the data into different files or groupings before analyzing it using a traditional joint data analysis system. However, in many real-world applications, the measured parameter data from different operating conditions is mixed together in the time domain in a way which makes separation of the data based on operating condition impractical or impossible.

The techniques of the present disclosure were developed in order to overcome the problems with traditional robot joint data analysis systems, described above. The presently-disclosed method uses clustering techniques to separate time-series robot joint parameter data into clusters, where data points from different operating conditions naturally fall into different clusters, and any “leftover” data points (those not belonging to the operating condition clusters) may be readily evaluated to determine if they represent outliers (such as points taken during transition from one operating condition to another), or problems needing to be addressed, or some other type of anomaly.

Figure 3:
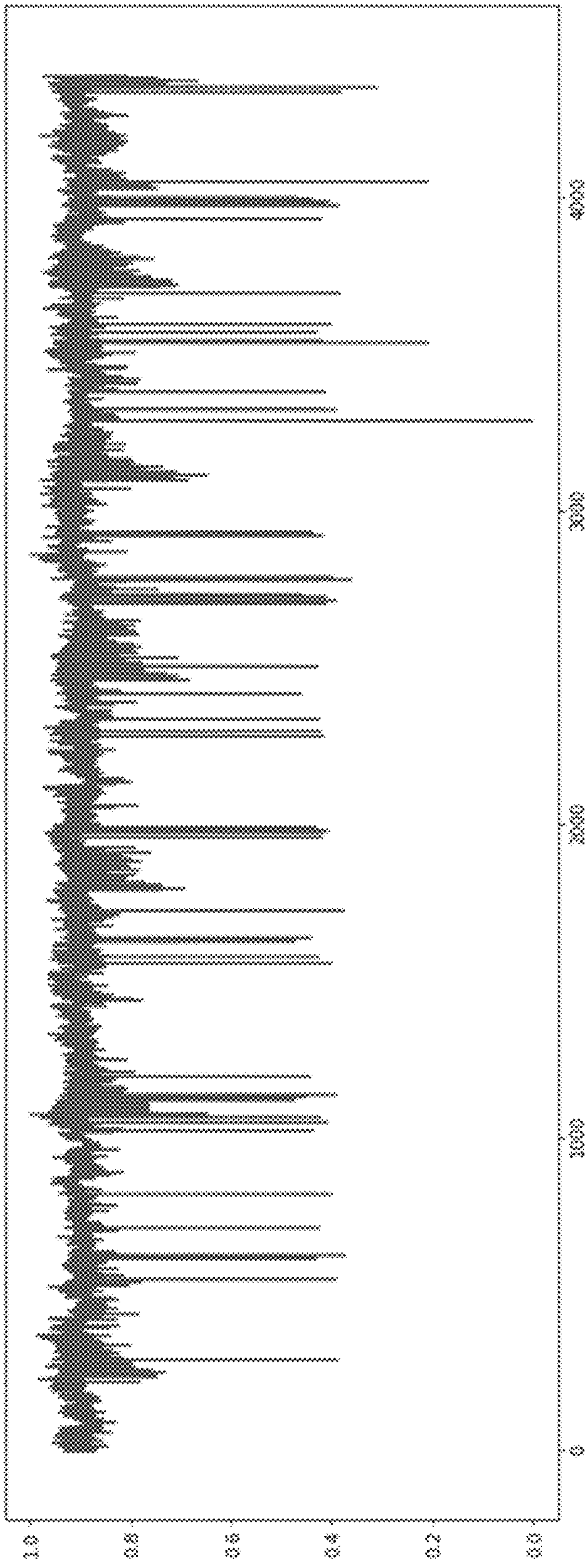
FIG. 3 is a graph of robot joint parameter data from a real-world scenario in which the robot frequently switches back and forth between two different operating conditions, where the parameter data is to be analyzed using the techniques of the present disclosure.

FIG. 3 is a graph 300 of robot joint parameter data from a real-world scenario in which the robot frequently switches back and forth between two different operating conditions, where the parameter data is to be analyzed using the techniques of the present disclosure. The graph 300 plots “disturbance torque” at a robot joint versus time. Disturbance torque is defined as the difference between the theoretically estimated torque and the actual torque. The theoretically estimated torque is the torque computed by the robot controller as being needed to move the robot according to the defined motion program, and the actual torque may be directly measured or may be determined from measured current to the joint motor. The disturbance torque value may be normalized to fall within a prescribed range, such as zero to one. The data contained in the graph 300 is time-series data for several thousand data points over a period of time. The amount of elapsed time covered in the graph 300 is irrelevant—it could be a number of hours, days, weeks, or any other time period.

The data points plotted on the graph 300 are from two different operating conditions of the robot. It is impossible to determine this by visual inspection of the graph 300 because, unlike in the graph 240 of FIG. 2, the data points from the different operating conditions in the graph 300 are interspersed with each other. For example, a number of data points might be collected while the robot is performing in operating condition number one, then some data points collected from operating condition two, then more data points from operating condition one, and so forth. Alternately, the data points in the graph 300 may be recorded less frequently than the operating condition cycling; for example, one data point could be recorded each hour, while the operating conditions switch every minute or two. In this case, each individual data point could randomly come from operating condition one or operating condition two, or even from some other circumstance such as an operating condition transition.

The data analysis techniques of the present disclosure have been developed to separate data points into groups (clusters) based on similarity characteristics among the data points. By doing so, the data points are naturally separated into clusters based on operating condition, with no advance knowledge of how many operating conditions are represented in the dataset, and no advance knowledge of which data points correspond with which operating conditions. These clustering and analysis methods are discussed in detail below.

Figure 4:
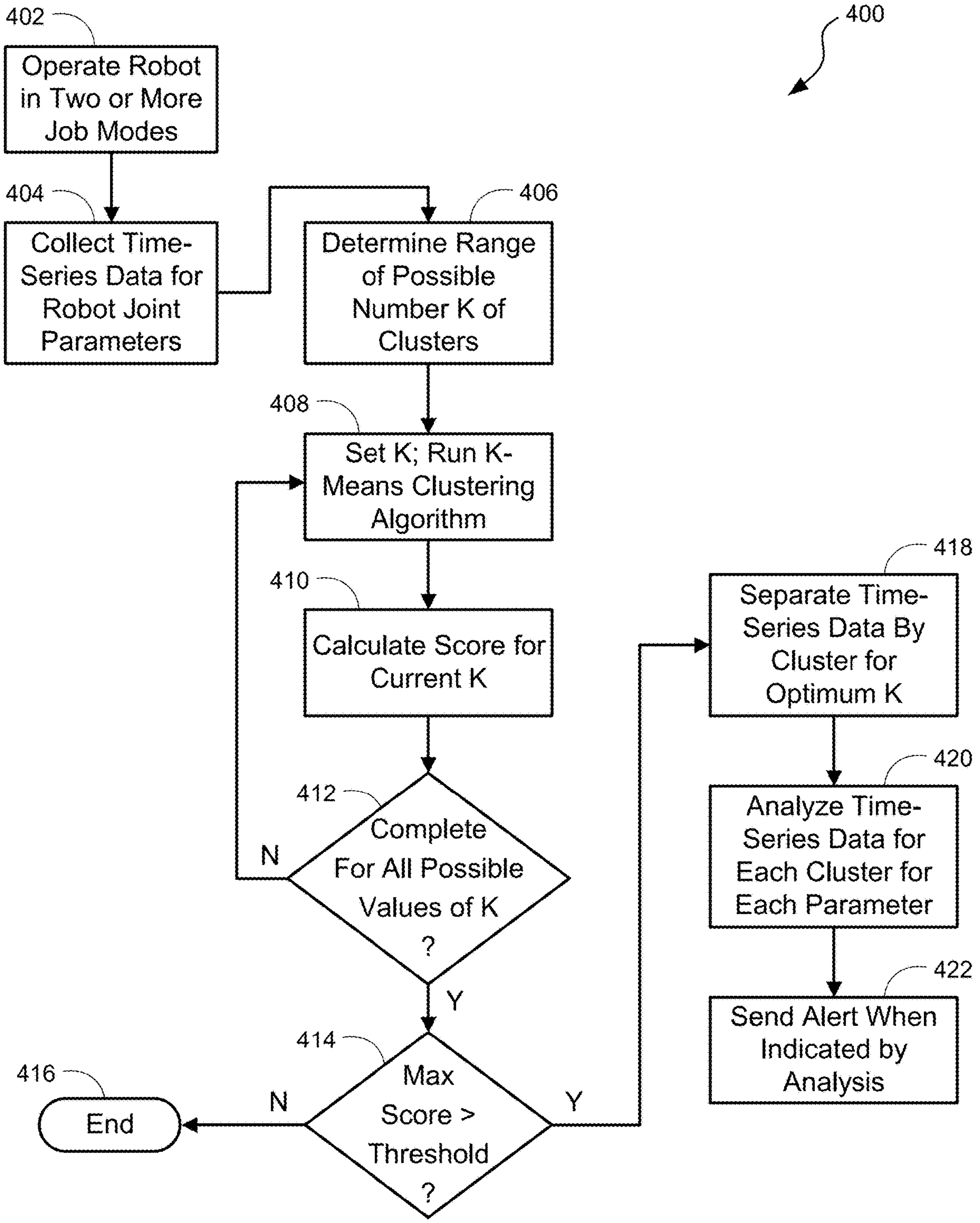
FIG. 4 is a flowchart diagram of a method for robot data analysis including clustering to separate the data by operating condition, according to an embodiment of the present disclosure.

FIG. 4 is a flowchart diagram 400 of a method for robot data analysis including clustering to separate the data by operating condition, according to an embodiment of the present disclosure. Although different clustering techniques may be used to separate robot joint parameter data based on operating condition, FIG. 4 depicts a method using K-means clustering specifically. At box 402, a robot is operated in one or more operating conditions. At box 404, time-series data for a plurality of robot joint parameters is collected. In the example discussed in detail here, three different parameters are collected for a robot joint. The parameters are joint torque, disturbance torque (defined above) and error count. The error count parameter is a number of degrees of position error (difference between command and actual joint rotational position).

For the following discussion, consider that the parameter data which is recorded is time-series data for each parameter (torque, disturbance torque and error count) for one joint (e.g., the joint 130 of FIG. 1) of a particular robot. In other words, at each sampling time, the three parameters are measured and recorded along with the time stamp. If the method of FIG. 4 is to be applied to multiple robots, and/or multiple joints in a robot, the data for each joint of each robot is kept separate.

At box 406, a range of possible number of clusters “K” is defined. For example, in relatively simple examples such as discussed later, the number of clusters may be expected to fall within a range of two to five. For more complex datasets-such as a motion program with many branches where the robot is performing many different operations in many different robot poses—the number of clusters may be much higher, such as in a range from 2-20. At box 408, a K-means clustering algorithm is executed on the collected joint parameter data. The objective of a clustering algorithm is to generate a group assignment where objects that are similar are in the same group and those that are dissimilar (far from each other in data space) are in different groups. As discussed earlier, the purpose of clustering in the presently-disclosed method is to categorize/separate robot operational data based on common modes of operation of the robot so that performance and accuracy of data analysis can be greatly improved.

Figure 5:
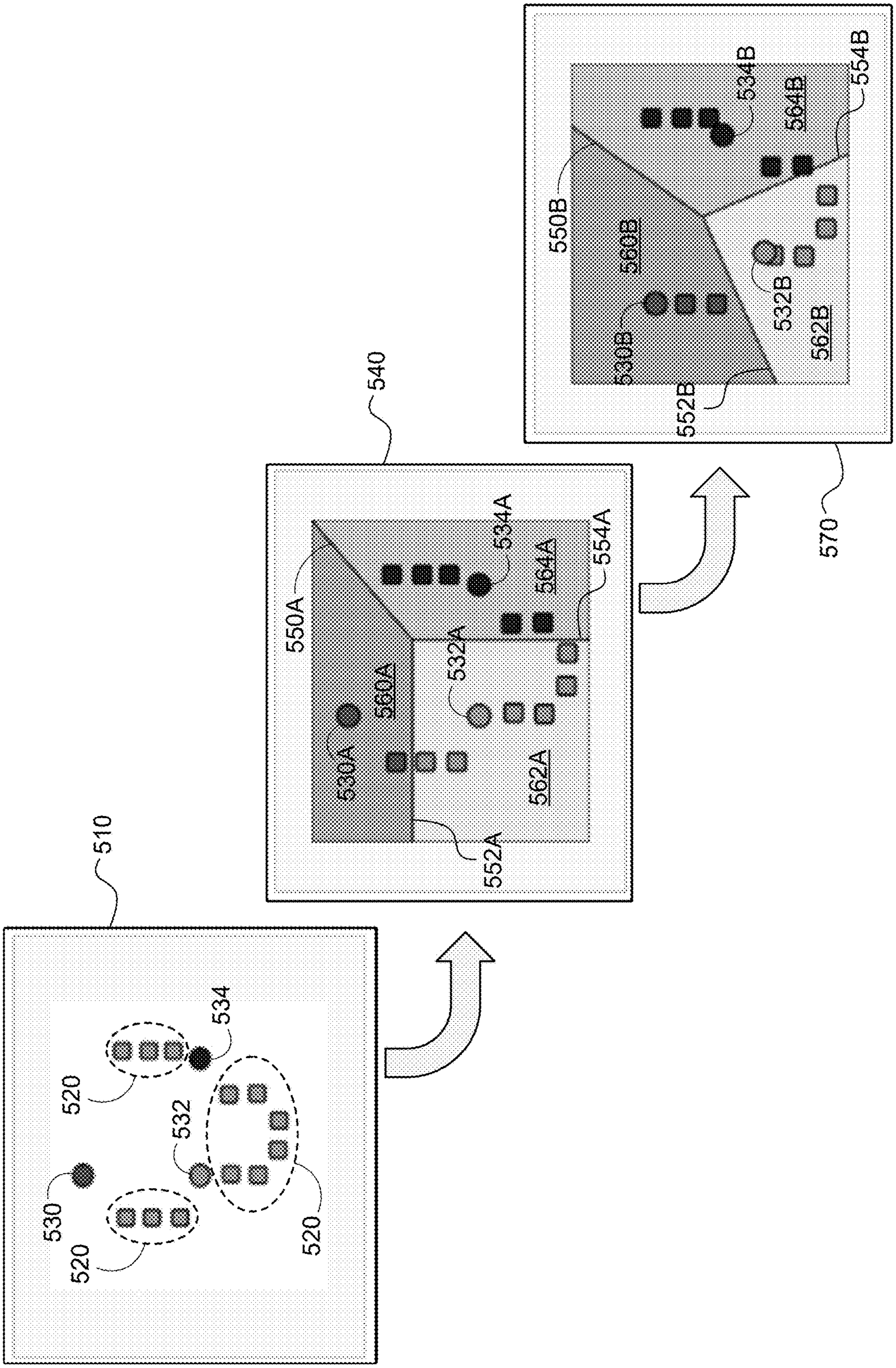
FIG. 5 is an illustration of the steps involved in clustering the robot parameter data using K-means clustering, as included in the method of FIG. 4, according to an embodiment of the present disclosure.

FIG. 5 is an illustration of the steps involved in clustering the robot parameter data using K-means clustering, as included in the method of FIG. 4, according to an embodiment of the present disclosure. K-means clustering is one type of clustering algorithm. It uses means of groups of the data points for the partition process, and the groups/partitions and means are recomputed recursively in an optimization calculation. The objective of the optimization is to minimize the variance within each cluster. Given a set of "n" observations (x1, x2, . . . , xn), where each observation is a d-dimensional real vector, K-means clustering aims to partition the n observations into "K" sets so as to minimize the within-cluster sum of squares (i.e. variance).

FIG. 5 is a two-dimensional illustration (for simplicity) depicting the d-dimensional vector space. At an initial step shown in box 510, the n observations (data points) are shown in dashed ellipses, all of which are labeled 520. It is important to note that the data points are not assigned to any cluster or group at this stage. Also at the initial step in the box 510, given the number of clusters K as input, K centroids are randomly placed in the data space. In the present example, the number of clusters K=3. The three centroids in the initial step in the box 510 are labeled as 530, 532 and 534.

In a next step shown in box 540, the iterative optimization computation begins. The centroids (means) are now labeled as 530A, 532A and 534A. Each data point (of the data points 520) is assigned to the centroid or mean point to which it is closest in vector space. With each data point assigned to one of the three centroids, partitions may be drawn which separate the clusters, and each data point is assigned to the cluster corresponding to its mean. In the step shown in the box 540, the partitions are depicted as straight lines, labeled 550A, 552A and 554A. The resulting clusters (shown as geometric areas in this 2D representation; actually volumes in vector space) are labeled 560A, 562A and 564A.

After each of the data points 520 is assigned to a cluster as in the box 540, a new mean is computed as the centroid of the data points in each cluster, and the data points are again assigned to the cluster having the nearest mean. This process is repeated until there is little change (i.e., less than a predefined threshold amount) of the centroids and partitions, at which point the iteration is considered converged.

In a box 570, a final iteration of the K-means clustering optimization for the data points 520 is shown. In the box 570, the centroids have moved to their final locations, labeled as 530B, 532B and 534B. Accordingly, the partitions have moved to their final locations, labeled 550B, 552B and 554B. The final shapes of the clusters are labeled 560B, 562B and 564B. It is noted that the data points 520 themselves do not move during the iterations; each data point is fixed in vector space based on its vector values.

As discussed above, the K-means clustering algorithm requires the number of clusters K to be provided as an input.

Because the technique of the present disclosure does not presume or require any advance knowledge of the number of operating conditions contained in the data points, there is no way to know in advance the optimum value of K. Therefore, it is necessary to include a methodology for determining a number of clusters (i.e., the value of K) which best matches the data.

Returning to FIG. 4, at the box 408 (discussed above), the value of K is defined for the execution of the K-means clustering algorithm, starting with the lowest value in the range from the box 406. At box 410 (discussed below), a score is calculated which represents how well the K-means clustering results for the current value of K match the data. At decision diamond 412, it is determined whether the K-means clustering algorithm and score calculation have been completed for all possible values of K (in the predefined range). Looping through the box 408, the box 410 and the decision diamond 412 continues until the K-means clustering algorithm is executed for all of the required values of K.

Figure 6:
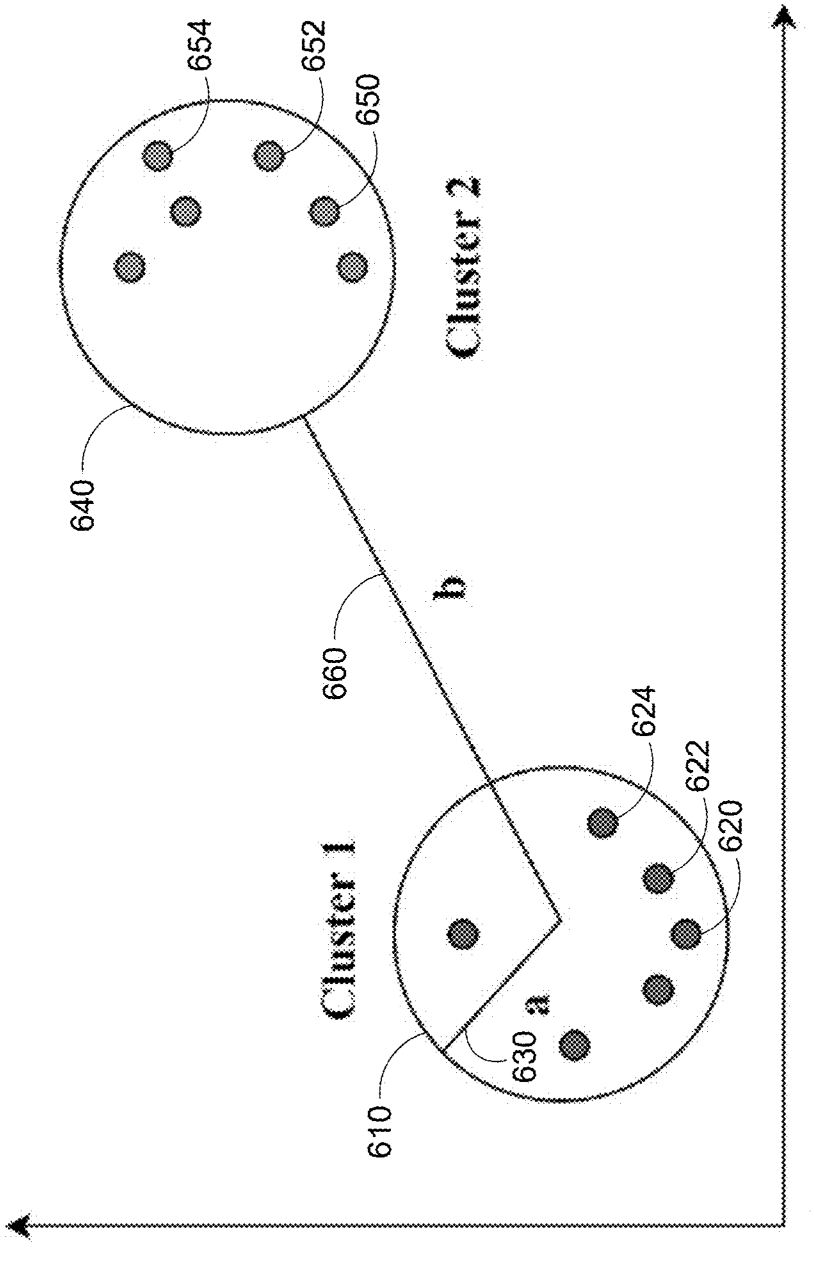
FIG. 6 is an illustration of a scoring technique used for evaluating K-means clustering results computed with different values of K as in the method of FIG. 4, according to an embodiment of the present disclosure.

FIG. 6 is an illustration of a scoring technique used for evaluating K-means clustering results computed with different values of K as in the method of FIG. 4, according to an embodiment of the present disclosure. The scoring technique illustrated in FIG. 6 and described here is executed in the box 410 of FIG. 4. FIG. 6 is also drawn in 2D for simplicity; in actual practice, the 2D distances of FIG. 6 should be understood to correspond to distances in d-dimensional vector space. Furthermore, FIG. 6 is shown with data points in two clusters, as only two clusters are necessary to illustrate the calculation. It is to be understood that the scoring technique of FIG. 6 is equally applicable to other numbers of clusters (e.g., 3, 4, 5, etc.).

The technique shown in FIG. 6 is known as a silhouette scoring method. In the silhouette method, a score is computed which falls within a range, such as [−1, 1]. The higher the score is, the better the data points have been assigned to different clusters by the K-means clustering algorithm. Thus, after running the K-means clustering algorithm using several different values of K, the K-means clustering results which generate the highest silhouette score correspond to the optimum value of K; that is, the value of K which produces the best clustering of the data points. The silhouette score technique discussed here with respect to FIG. 6 is just one example of a scoring technique to quantify the clustering data results; other cluster consistency scoring techniques may be used as deemed suitable.

Again, the silhouette scoring method is executed after the K-means clustering algorithm has been run for a particular value of K. Thus, each data point has been assigned to a cluster. In FIG. 6, a first cluster 610 includes data points 620, 622, 624, etc. A second cluster 640 includes data points 650, 652, 654, etc.

For each data point $i \in C_I$, a(i) is defined as the mean distance between i and all other data points in the same cluster, where $|C_I|$ is the number of points belonging to the cluster I, and d(i,j) is the distance between data points i and j. The calculation of a(i) is shown in Equation (1) below:

$$a(i) = \frac{1}{(|C_I| - 1)} \sum_{j \in C_I, i \neq j} d(i, j) \quad (1)$$

For each data point $i \in C_I$, b(i) is defined as the minimum mean dissimilarity of point i to all data points in cluster $C_J$, where $C_I \neq C_J$. The calculation of b(i) is shown in Equation (2) below:

$$b(i) = \min_{J \neq I} \frac{1}{|C_J|} \sum_{j \in C_J} d(i, j) \quad (2)$$

In FIG. 6, the mean intra-cluster distance a is labeled 630, and the mean inter-cluster distance b is labeled 660.

For each data point i in each cluster, a score value s(i) is computed as follows:

$$s(i) = \frac{b(i) - a(i)}{\max\{a(i), b(i)\}} \quad (3)$$

Where the variables in Equation (3) have all been defined above. In Equation (3), a larger value of b(i) and a smaller value of a(i) lead to a higher value for the point score s(i). For each cluster, the average value of s(i) measures how tightly all of the points in the cluster are grouped.

An overall score is then computed for the K-means clustering model using the particular value of K (number of clusters). The overall silhouette score SC is computed as follows:

$$SC = \max_{K} \tilde{s}(K) \quad (4)$$

Where $\tilde{s}$ is the average value of s(i) for all data points i in a cluster K.

Returning to FIG. 4, the K-means clustering algorithm is executed for a particular value of K (number of clusters) at the box 408 and as illustrated in FIG. 5, the score (e.g., silhouette score) for the particular value of K is computed at the box 410 and as illustrated in FIG. 6 and using Equations (1)-(4), and this process is repeated via the decision diamond 412 for all prescribed values of K (e.g., 2-5). Thus, at this stage in the process, a set of clustering results (data points assigned to clusters) and a score is available for each prescribed value of K. For example, the silhouette scores SC (K) for the values of K might be SC(2)=0.7; SC(3)=0.9; SC(4)=0.4; and SC(5)=0.3.

Then, at decision diamond 414, it is determined if the maximum score for any of the values of K is greater than a predefined threshold. In the case of silhouette scoring, the threshold may be set to a value of 0.5, as an example. If the maximum score for any of the values of K is not greater than the threshold, this indicates that none of the K-means clustering results is a good fit to the data points, and the process ends at terminus 416.

If the maximum score for any of the values of K is greater than the threshold, then at box 418 the K-means clustering results for the optimum value of K are used. In the example silhouette scores listed above, the highest score was SC(3) =0.9, which means that K=3 (i.e., three clusters) provided the best fit to the data points. Therefore, at the box 418, the time-series data points are separated based on which cluster they were assigned to in the K-means clustering execution using K=3.

Figure 7:
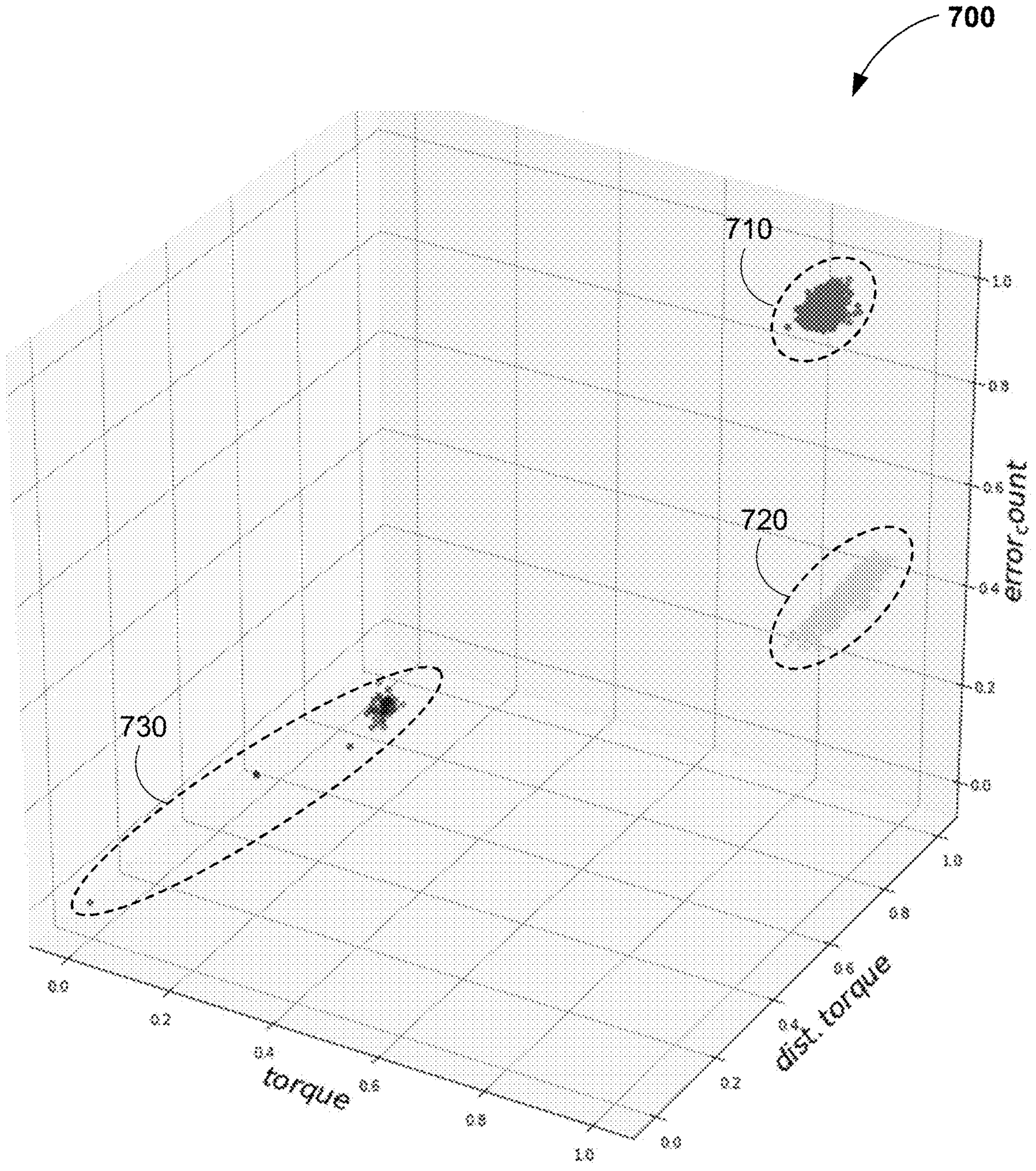
FIG. 7 is a three dimensional graph which plots a plurality of time-series data points having coordinates defined by three different robot joint parameters, where data clusters are evident in the graph which match the K-means clustering results, according to an embodiment of the present disclosure.

FIG. 7 is a three dimensional graph 700 which plots a plurality of time-series data points having coordinates defined by three different robot joint parameters, where data clusters are evident in the graph which match the K-means clustering results, according to an embodiment of the present disclosure. As explained earlier, in the example discussed throughout this disclosure, time-series data is collected for three different joint parameters; joint torque, disturbance torque and error count. This results in a joint torque data set having many (e.g., several thousand) entries, a disturbance torque data set having the same number of entries, and an error count data set having the same number of entries, with each measured parameter value also recording the corresponding time stamp. For example, the first entry in the joint torque data set might have a normalized value of 0.8, the first entry in the disturbance torque data set might have a normalized value of 0.85, and the first entry in the error count data set might have a normalized value of 0.9. A data point having coordinates (0.8, 0.85, 0.9)—which represents the first time—series data sample—can then be plotted on the graph 700. When the many thousands of time-series data points are all plotted in this manner, the result is as shown in FIG. 7.

The locations of the thousands of data points is purely a function of the raw time-series data from the robot joint; the point locations are not affected by the K-means clustering algorithm. However, when each point is formatted (e.g., by color or grayscale) according to its cluster from the K-means clustering analysis (per the box 418 of FIG. 4), it is immediately apparent that the K-means clustering results have accurately mirrored the spatial clusters of data points as seen on the graph 700. The data points which were assigned by the K-means clustering algorithm (with K=3) to a first cluster are contained in an ellipse 710, the data points which were assigned to a second cluster are contained in an ellipse 720, and the data points which were assigned to a third cluster are contained in an ellipse 730.

It can be seen that the data points in the ellipse 710 (first cluster) and the data points in the ellipse 720 (second cluster) are spatially quite dense, or tightly packed—so much so that they appear as blobs rather than the hundreds of individual data points that they are. The data points in the ellipse 730 (third cluster) are far fewer in number and far more spread out spatially. The physical meaning of the clusters is discussed further below in connection with FIGS. 8 and 9.

FIG. 7 provides a clear illustration that the data point cluster assignment from the K-means clustering algorithm accurately captures the spatial locations of the data points plotted from the time-series data for the three parameters. It is emphasized that neither the spatial locations of the data points nor the cluster assignment of each data point requires any advance knowledge of the number of operating conditions contained in the raw time-series data. However, when validation experiments are run in which each time-series data point is labelled with the operating condition which was running when the data point was recorded, two very important results were confirmed. First, the optimal value of K (number of clusters) to use in the K-means clustering algorithm was normally one higher than the number of operating conditions in the raw time-series data. The time-series data for the example shown in FIG. 7 included two operating conditions; the optimal value of K was determined to be three in the example silhouette score calculation of FIG. 4, and those three clusters are visible in FIG. 7.

The second important result was that the individual data points were assigned to clusters in accordance with the operating condition which was running when the data point was recorded. In FIG. 7, the data points located in the first cluster 710 were points recorded from operating condition number one. The data points located in the second cluster 720 were points recorded from operating condition number two. The data points located in the third cluster 730 might have been from operating condition number one or two, or from a transition phase. The data points in the cluster 730 may also represent anomaly data points which need further analysis, as discussed further below.

Figure 8:
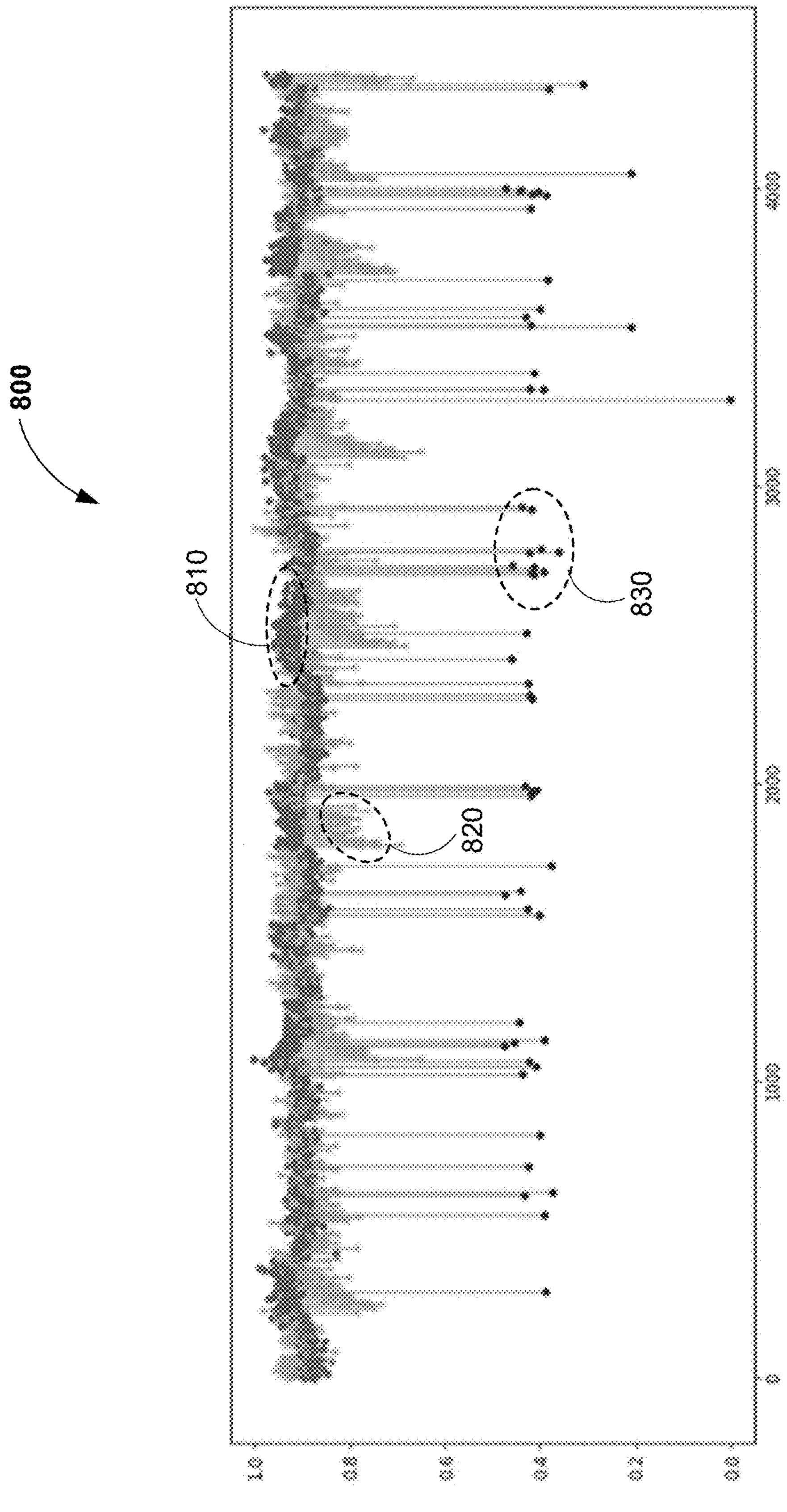
FIG. 8 is a graph of the robot joint parameter data from FIG. 3, where each time-series data point has been assigned to one of the three clusters as shown in FIG. 7, according to an embodiment of the present disclosure.

FIG. 8 is a graph 800 of the robot joint parameter data from FIG. 3, where each time-series data point has been assigned to one of the three clusters as shown in FIG. 7, according to an embodiment of the present disclosure. As in FIG. 3, the graph 800 of FIG. 8 plots disturbance torque at the robot joint versus time. When each data point in the graph 800 is formatted with a color (or grayscale shade) according to its cluster assignment, it is immediately apparent that the data points in the cluster 710 (of FIG. 7) are all contained in a narrow band of normalized disturbance torque values, between 0.8 and 1.0. A representative grouping of these points is enclosed in an ellipse 810. Similarly, the data points in the cluster 720 are all contained in a somewhat wider band of normalized disturbance torque values, between about 0.6 and 1.0. A representative grouping of these points is enclosed in an ellipse 820.

The number of data points in the cluster 730 is far fewer than the number of data points in the other two clusters, and these data points are scattered in lower ranges of disturbance torque value-between 0.0 and about 0.5. A representative grouping of these points is enclosed in an ellipse 830. These data points represent some combination of outliers, transitional points (not running either operating condition one or two), and possibly anomalies. The existence of this third group or cluster of data points explains why the optimal value of K is normally one higher than the number of operating conditions contained in the time-series data.

Once again, some important points need to be emphasized here. First, the data points from the two different operating conditions are interspersed in the time-series data. Thus, it is not possible to visually separate the data points into different operating condition groupings as illustrated in the graph 240 of FIG. 2. Second, the number of operating conditions in the data, and the particular operating condition which is represented in each time-series data point, are not known in advance. That is, the method for clustering to separate the data by operating condition, shown in FIG. 4, runs as an entirely unsupervised learning and analysis. The techniques of the present disclosure have been demonstrated to be effective in determining how many clusters exist in the time-series data, and assigning each data point to a cluster based on which operating condition it represents.

Figure 9A:
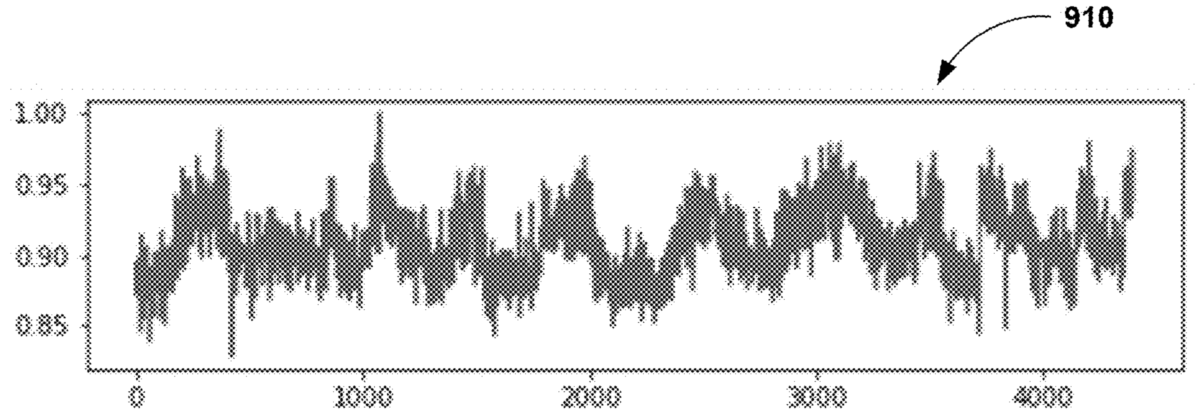
FIGS. 9A, 9B and 9C are graphs of the robot joint parameter data from FIG. 8, where the data points for each of the three clusters are plotted on separate graphs, according to an embodiment of the present disclosure.
Figure 9B:
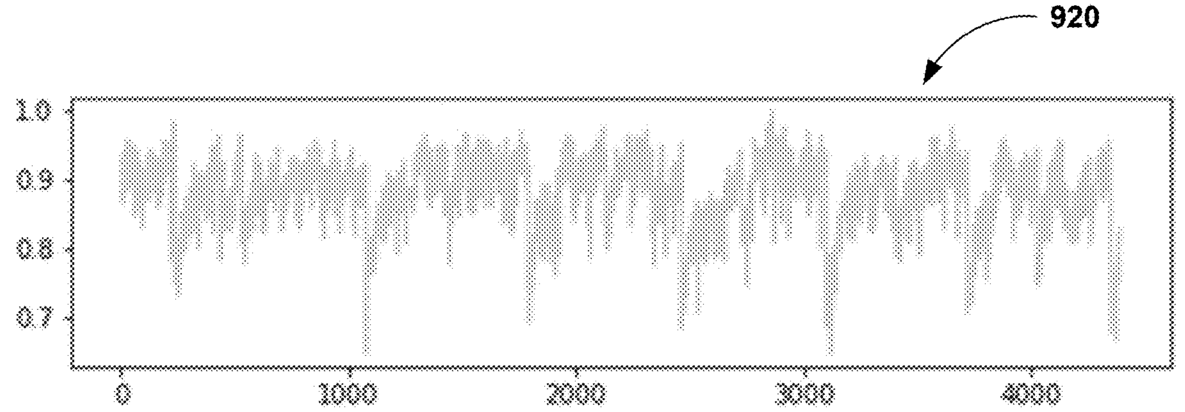
Figure 9C:
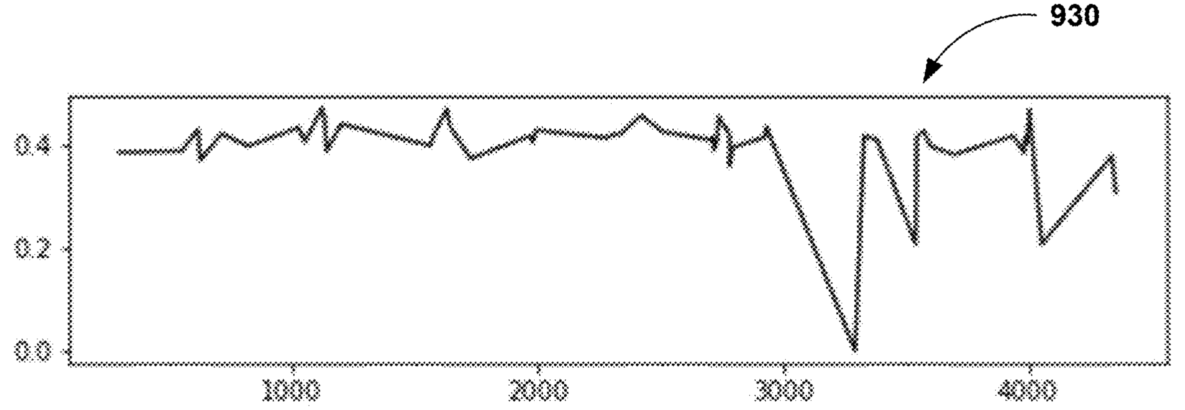

FIGS. 9A, 9B and 9C are graphs of the robot joint parameter data from FIG. 8, where the data points for each of the three clusters are plotted on separate graphs, according to an embodiment of the present disclosure. FIGS. 9A/9B/9C illustrate the real power of the presently disclosed techniques—that is, the ability to separate a large set of time-series data of unknown operating condition content into operating condition groupings, and visualize and analyze the data by operating condition.

In FIG. 8, the time-series data for disturbance torque was all plotted on a single graph, with each data point grayscale-coded based on its cluster assignment. In FIGS. 9A/9B/9C, each cluster's data is plotted on its own graph. A graph 910 includes the disturbance torque data points for the first cluster, which was enclosed in the ellipse 710 in FIG. 7 and a sample of which was enclosed in the ellipse 810 in FIG. 8. This first cluster represents the first operating condition of robot operations. A graph 920 includes the disturbance torque data points for the second cluster, which was enclosed in the ellipse 720 in FIG. 7 and a sample of which was enclosed in the ellipse 820 in FIG. 8. This second cluster represents the second operating condition of robot operations. A graph 930 includes the disturbance torque data points for the third cluster, which was enclosed in the ellipse 730 in FIG. 7 and a sample of which was enclosed in the ellipse 830 in FIG. 8. This third cluster represents the outlier or anomaly data points.

With the disturbance torque data separated by cluster as in FIGS. 9A/9B/9C, the true patterns in the data are apparent to both visual inspection and analytical software. In the graph 910 (first cluster; operating condition one), the normalized disturbance torque values fall very regularly within a range of about 0.8 to 1.0. Visual inspection of the graph 910 reveals no apparent problematic behavior at the robot joint, and a generalized analysis of the data patterns in the graph 910 will reveal a high frequency oscillation in data values superimposed on a lower frequency oscillation, where both of the frequency and amplitude characteristics appear to be consistent and regular over time. In other words, the robot is operating normally as indicated by the disturbance torque at the measured joint when running in operating condition one.

In the graph 920 (second cluster; operating condition two), the normalized disturbance torque values fall very regularly within a range of about 0.6 to 1.0. Visual inspection of the graph 920 again reveals no problematic behavior at the robot joint, and a generalized analysis of the data patterns in the graph 920 will reveal a high frequency oscillation in data values superimposed on one or more lower frequency oscillations, where the frequency and amplitude characteristics appear to be consistent and regular over time. In other words, the robot is operating normally as indicated by the disturbance torque at the measured joint when running in operating condition two.

The graph 930 contains the small number of data points from the third cluster. The graph 930 exhibits much more random fluctuation, although some points seem to be very similar, having values in a range around 0.4. It was apparent in the 3D graph of FIG. 7 that these points (in the third cluster) are far removed from the points in the other two clusters. Thus, these points represent outliers which can be evaluated in any preferred or suitable manner. Analytic software may be configured to detect certain values, or combinations of parameter values (for example, high joint torque and low disturbance torque in a time sample). A human analyst may also evaluate certain points as warranted based on visual inspection. With the data separated by cluster as in FIGS. 9A/9B/9C, analysis techniques—such as linear regression models, and others—can be performed on each cluster's data to detect any noteworthy characteristics.

FIGS. 8 and 9 contain data for only the disturbance torque parameter, with each data point assigned to its cluster as per the results of the K-means clustering algorithm. The other two joint parameters—joint torque and error count—can be similarly assigned to clusters as in FIG. 8, and plotted separately for analysis as in FIG. 9. The clustered data can also be viewed and analyzed in other ways—such as plotting the normalized values for all three parameters (joint torque, disturbance torque and error count) for the third cluster (outliers) on a single graph. Other parameters besides joint torque, disturbance torque and error count may be used, and may number more or fewer than three.

Returning to the flowchart diagram 400 of FIG. 4, at the box 418 the time-series data was separated by cluster. In the case of the disturbance torque data, this resulted in FIG. 8 where each data point is assigned to one of the three clusters, and further resulted in FIGS. 9A/9B/9C where each of the three graphs plots only the disturbance torque data points for a corresponding cluster. At box 420, the time-series data is analyzed for each cluster for each parameter, as discussed above with respect to FIGS. 9A/9B/9C in particular. The analysis of the data at the box 420 may include any combination of simple trend line calculation and slope analysis, and more sophisticated statistical and other analyses—which may be performed in the time domain and/or the frequency domain. All of these analyses are enabled by the clustering techniques described above which separate the data by operating condition.

At box 422, analytic software sends an alert when warranted by the analysis performed at the box 420. For example, if the graph 910 (FIG. 9A) had an upward trend over time similar to the graph 200 (FIG. 2), this would trigger the sending of an alert or alarm. Other types of data patterns and characteristics besides trend line slope may be detected and trigger the sending of an alert or alarm. Separating data points by cluster also improves the accuracy of other types of analysis, including manual analysis. For example, the outlier data points in the third cluster, because they are few in number, can be analyzed individually to determine if any of them indicate an anomaly condition which should be checked on the robot.

Validation experiments have confirmed the effectiveness of the disclosed techniques in a variety of ways. First, the K-means clustering algorithm in combination with the silhouette score calculation is able to automatically and accurately determine the correct number of clusters in the raw time-series data. When a third operating condition is included in the time-series joint data, the method of FIG. 4 accurately increments the value of K (number of clusters) by one. Furthermore, when each individual time-series data point is tagged during data collection to identify which operating condition it represents, and the tagged (true) operating condition is compared to the cluster assignment from the K-means clustering algorithm, the results show that data points are assigned to clusters corresponding with the correct operating condition with over 99% accuracy. This unsupervised learning method, with automatic determination of number of clusters and assignment of data points to a particular cluster, is critical for effective after-the-fact analysis of real production datasets in which the number of operating conditions contained in the data may not be known.

The methods and systems for robot production data clustering for anomaly prediction, disclosed above, have been developed to meet a real need in robot reliability enhancement—that is, the ability to accurately detect characteristics in robot data which is collected during multiple robot operating conditions. The disclosed techniques automatically and accurately separate the time-series data into clusters by operating condition, without the need to know the number of operating conditions contained. This enables accurate analysis and visualization of the robot joint parameter data to detect noteworthy characteristics, and investigation of any leftover outlier data points which might signal an anomaly needing attention.

Throughout the preceding discussion, various computers and controllers are described and implied. It is to be understood that the software applications and modules of these computers and controllers are executed on one or more electronic computing devices having a processor and a memory module. In particular, this includes a processor in the robot controller 102 of FIG. 1, and any other computer used for performing the steps and calculations embodied in the method of FIG. 4. In one embodiment, the controller 102 facilitates collection of the raw time-series data from the robot 100, and the time-series joint parameter data is provided to another computer which runs the K-means clustering algorithm and analyzes the separated data. The other computer may be local to the robot 100 and the controller 102, or may be remote, including cloud-based computing devices. Other permutations may be applicable as would be understood by those skilled in the art.

While a number of exemplary aspects and embodiments of the methods and systems for robot production data clustering for anomaly prediction have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for robot data analysis, said method comprising:

collecting time-series data for a plurality of joint parameters during operation of a robot;

defining a range of numbers of clusters to evaluate;

performing a clustering operation on the time-series data using a first number of clusters selected from the range, by a computing device, to assign each time-series data point to one of the clusters;

calculating a cluster consistency score for results of the clustering operation with the number of clusters;

performing the clustering operation and calculating the score for each remaining number of clusters in the range;

selecting the results of the clustering operation having a highest score;

separating the time-series data points into datasets according to cluster assignment in the selected results, where at least one of the datasets contains data points corresponding to an operating condition of the robot;

analyzing the datasets, including analyzing each of the datasets containing data points corresponding to an operating condition of the robot to identify data patterns; and sending an alert when an alert criteria is met in the analyzing.

2. The method according to claim 1 wherein the joint parameters include at least one parameter containing torque data for a joint of the robot.

3. The method according to claim 2 wherein the joint parameters include joint torque at the joint, disturbance torque at the joint and positional error at the joint, where disturbance torque is a difference between a theoretically estimated torque and an actual torque.

4. The method according to claim 1 wherein the time-series data includes at least two different operating conditions of operation of the robot.

5. The method according to claim 4 wherein the operation of the robot switches back and forth between the different operating conditions any number of times during the collecting of the time-series data.

6. The method according to claim 4 wherein, after separating the time-series data points into datasets according to cluster assignment, the data points from each of the different operating conditions are contained in a different dataset.

7. The method according to claim 1 wherein separating the time-series data points into datasets and analyzing the datasets are only performed when the highest score is greater than a predefined threshold.

8. The method according to claim 1 wherein the clustering operation uses K-means clustering and the number of clusters is K.

9. The method according to claim 8 wherein performing a K-means clustering operation includes defining a quantity of means equal to the number K, associating each of the data points with a nearest of the means in vector space, defining spatial clusters each containing one mean and its associated data points, calculating a new mean for each cluster, and repeating associating, defining and calculating until an amount of change from one iteration to the next is below a predefined threshold.

10. The method according to claim 1 wherein the cluster consistency score is a silhouette score, and calculating a silhouette score includes computing a distance from each data point to all other data points in a same cluster (intra-cluster distances) and computing a distance from each data point to all other data points in other clusters (inter-cluster distances), and the silhouette score is calculated using a computation in which a higher silhouette score results from larger inter-cluster distances and smaller intra-cluster distances.

11. The method according to claim 1 wherein analyzing the datasets includes separately analyzing the datasets for each joint parameter for each cluster.

12. The method according to claim 1 wherein one of the datasets contains outlier data points not corresponding to an operating condition of the robot, and the outlier data points are analyzed to detect any robot operational anomalies.

13. A system for robot data analysis, said system comprising:

means for collecting time-series data for a plurality of joint parameters during operation of a robot; and a computing device with a processor and memory configured for;

defining a range of numbers of clusters to evaluate;

performing a clustering operation on the time-series data, using a first number of clusters selected from the range, to assign each time-series data point to one of the clusters;

calculating a cluster consistency score for results of the clustering operation with the number of clusters;

performing the clustering operation and calculating the score for each remaining number of clusters in the range;

selecting the results of the clustering operation having a highest score;

separating the time-series data points into datasets according to cluster assignment in the selected results, where at least one of the datasets contains data points corresponding to an operating condition of the robot;

analyzing the datasets, including analyzing each of the datasets containing data points corresponding to an operating condition of the robot to identify data patterns; and sending an alert when an alert criteria is met in the analyzing.

14. The system according to claim 13 wherein the joint parameters include at least one parameter containing torque data for a joint of the robot.

15. The system according to claim 14 wherein the joint parameters include joint torque at the joint, disturbance torque at the joint and positional error at the joint, where disturbance torque is a difference between a theoretically estimated torque and an actual torque.

16. The system according to claim 13 wherein the time-series data includes at least two different operating conditions of operation of the robot.

17. The system according to claim 16 wherein the operation of the robot switches back and forth between the different operating conditions any number of times during the collecting of the time-series data.

18. The system according to claim 16 wherein, after separating the time-series data points into datasets according to cluster assignment, the data points from each of the different operating conditions are contained in a different dataset.

19. The system according to claim 13 separating the time-series data points into datasets and analyzing the datasets are only performed when the highest score is greater than a predefined threshold.

20. The system according to claim 13 wherein the clustering operation uses K-means clustering and the number of clusters is K.

21. The system according to claim 20 wherein performing a K-means clustering operation includes defining a quantity of means equal to the number K, associating each of the data points with a nearest of the means in vector space, defining spatial clusters each containing one mean and its associated data points, calculating a new mean for each cluster, and repeating associating, defining and calculating until an amount of change from one iteration to the next is below a predefined threshold.

22. The system according to claim 13 wherein the cluster consistency score is a silhouette score, and calculating a silhouette score includes computing a distance from each data point to all other data points in a same cluster (intra-cluster distances) and computing a distance from each data point to all other data points in other clusters (inter-cluster distances), and the silhouette score is calculated using a computation in which a higher silhouette score results from larger inter-cluster distances and smaller intra-cluster distances.

23. The system according to claim 13 wherein analyzing the datasets includes separately analyzing the datasets for each joint parameter for each cluster.

24. The system according to claim 13 wherein the means for collecting time-series data is a robot controller, and the computing device is either the robot controller or a different computer.

25. The system according to claim 13 wherein one of the datasets contains outlier data points not corresponding to an operating condition of the robot, and the outlier data points are analyzed to detect any robot operational anomalies.

* * * * *